US012439139B2

(12) United States Patent
Chun et al.

(10) Patent No.: US 12,439,139 B2
(45) Date of Patent: Oct. 7, 2025

(54) LENS DRIVER

(71) Applicant: SAMSUNG ELECTRO-MECHANICS CO., LTD., Suwon-si (KR)

(72) Inventors: Jibuem Chun, Suwon-si (KR); Hongjoo Lee, Suwon-si (KR); Namki Park, Suwon-si (KR); Jongwoo Hong, Suwon-si (KR); Jaehyung Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 91 days.

(21) Appl. No.: 17/983,862

(22) Filed: Nov. 9, 2022

(65) Prior Publication Data

US 2023/0209160 A1 Jun. 29, 2023

(30) Foreign Application Priority Data

Dec. 28, 2021 (KR) .................. 10-2021-0189817
Aug. 9, 2022 (KR) .................. 10-2022-0099327

(51) Int. Cl.
*H04N 23/54* (2023.01)
*G02B 7/08* (2021.01)
*H04N 23/55* (2023.01)
*H04N 23/57* (2023.01)

(52) U.S. Cl.
CPC ............. *H04N 23/54* (2023.01); *G02B 7/08* (2013.01); *H04N 23/55* (2023.01); *H04N 23/57* (2023.01)

(58) Field of Classification Search
None
See application file for complete search history.

(56) References Cited

U.S. PATENT DOCUMENTS

| 2014/0098434 | A1 | 4/2014 | Baik et al. | |
|---|---|---|---|---|
| 2015/0256727 | A1* | 9/2015 | Kim ..................... | G03B 5/04 |
| | | | | 348/208.12 |
| 2017/0212409 | A1* | 7/2017 | Kim ..................... | G03B 13/36 |
| 2019/0294027 | A1* | 9/2019 | Kim ..................... | G03B 5/00 |

(Continued)

FOREIGN PATENT DOCUMENTS

| KR | 10-1328301 B1 | 11/2013 |
|---|---|---|
| KR | 20180071779 A * | 12/2016 |

(Continued)

OTHER PUBLICATIONS

English translation of KR-102003282-B1, 2017, An Jae Yong (Year: 2017).*

(Continued)

*Primary Examiner* — James M Hannett
(74) *Attorney, Agent, or Firm* — NSIP Law

(57) ABSTRACT

A lens driver includes a coil that is disposed on a substrate, a sensing portion that is disposed to not overlap the coil along a first direction and a second direction in which the substrate extends, a first magnet that faces the coil along a third direction that is perpendicular to the first direction and the second direction, and a second magnet that faces the sensing portion along the third direction, wherein a first distance between the substrate and the first magnet and a second distance between the substrate and the second magnet along the third direction are different from each other.

20 Claims, 21 Drawing Sheets

(56) References Cited

U.S. PATENT DOCUMENTS

2020/0272027 A1* 8/2020 Kim .................... G03B 3/10
2021/0173224 A1   6/2021 Seo et al.

FOREIGN PATENT DOCUMENTS

| | | | | |
|---|---|---|---|---|
| KR | 20180116965 A | * | 4/2017 | |
| KR | 102003282 B1 | * | 6/2017 | |
| KR | 10-2018-0135270 A | | 12/2018 | |
| KR | 10-2020-0063487 A | | 6/2020 | |
| KR | 10-2020-0092560 A | | 8/2020 | |
| KR | 10-2020-0133703 A | | 11/2020 | |
| KR | 10-2021-0004196 A | | 1/2021 | |
| KR | 10-2021-0048037 A | | 5/2021 | |
| KR | 10-2021-0073325 A | | 6/2021 | |
| WO | WO-2016021391 A1 | * | 2/2016 | ............... G02B 7/08 |
| WO | WO-2019184940 A1 | * | 10/2019 | ............. G03B 13/36 |

OTHER PUBLICATIONS

English translation of KR-20180071779-A, 2016, Seo et al (Year: 2016).*
English translation of KR-20180116965-A, 2017, Seol et al (Year: 2017).*
English translation of WO-2019184940-A1, 2019, Li D (Year: 2019).*
English translation of WO-2016021391-A1, 2016, Ishizawa T (Year: 2016).*
Korean Office Action issued on Oct. 10, 2024, in counterpart Korean Patent Application No. 10-2022-0099327 (8 pages in English, 7 pages in Korean).
Korean Office Action Issued on Jun. 24, 2025, in Counterpart Korean Patent Application No. 10-2022-0099327 (2 Pages in English, 2 Pages in Korean).

* cited by examiner

LENS DRIVER

CROSS-REFERENCE TO RELATED APPLICATIONS

This application claims the benefit under 35 USC 119(a) of Korean Patent Application No. 10-2021-0189817 filed in the Korean Intellectual Property Office on Dec. 28, 2021, and Korean Patent Application No. 10-2022-0099327 filed in the Korean Intellectual Property Office on Aug. 9, 2022, the entire disclosures of which are incorporated herein by reference for all purposes.

BACKGROUND

1. Field

The present disclosure relates to a lens driver.

2. Description of the Background

With the remarkable development of information communication technology and semiconductor technology, the dissemination and use of electronic devices is rapidly increasing. Such an electronic device tends to provide various functions by convergence rather than maintaining in its traditional unique regions.

Recently, cameras are basically adopted in portable electronic devices such as smartphones, tablet PCs, and laptop computers, and the cameras of these portable electronic devices may include an auto focus (AF) function, an image stabilizer (IS) function, and a zoom function.

As the electronic device on which the camera module is mounted becomes thinner, the thickness of the camera module also tends to become thinner.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens driver includes a coil that is disposed on a substrate, a sensing portion that is disposed to not overlap the coil along a first direction and a second direction in which the substrate extends, a first magnet that faces the coil along a third direction that is perpendicular to the first direction and the second direction, and a second magnet that faces the sensing portion along the third direction, wherein a first distance between the substrate and the first magnet and a second distance between the substrate and the second magnet along the third direction are different from each other.

The sensing portion may be disposed between the substrate and the second magnet along the third direction.

A thickness of the first magnet and a thickness of the second magnet may be equal to each other along the third direction.

The lens driver may further include a yoke that is disposed on rear surfaces of the first magnet and the second magnet, wherein the yoke may include a protrusion that overlaps the second magnet along the third direction.

A thickness of the first magnet and a thickness of the second magnet may be different from each other along the third direction.

The thickness of the first magnet may be larger than the thickness of the second magnet.

The lens driver may further include a yoke that is disposed on rear surfaces of the first magnet and the second magnet, wherein the yoke may have a flat surface.

The first magnet may include a first portion facing the coil along the third direction and a second portion facing the sensing portion, and a thickness of the second portion of the first magnet and a thickness of the second magnet may be equal to each other.

In another general aspect, a lens driver includes a first coil and a second coil that are disposed on a substrate extending in a first direction and a second direction, and disposed apart from each other, a sensing portion that overlaps an area between the first coil and the second coil along a third direction that is perpendicular to the first direction and the second direction, a first magnet that faces the first coil along the third direction, and a second magnet that faces the second coil along the third direction.

The substrate may include a hole, and the sensing portion may be disposed inside the substrate.

The sensing portion may be disposed on a rear surface of the substrate.

The sensing portion may be disposed on a plane that faces the first magnet and the second magnet.

The sensing portion may overlap an end of the first magnet and an end of the second magnet along the third direction, and the sensing portion may overlap a portion between the first magnet and the second magnet along the third direction.

The substrate may include a hole, and the sensing portion may be disposed to face the hole.

In another general aspect, a lens driver includes a coil that is disposed in a substrate, a sensing portion that is disposed at an inner side of the coil to not overlap the coil, a magnet that faces the coil, and a yoke that is disposed on a rear surface of the substrate, wherein the yoke includes a hole, and the sensing portion faces the yoke.

The lens driver may further include a sub-yoke that is spaced apart from the coil and faces the magnet.

The substrate may include a trench, and the sub-yoke may face the trench of the substrate.

The lens driver may further include a sub-yoke that is spaced apart from the coil, and faces a magnet, wherein the sub-yoke may be embedded to the yoke.

In another general embodiment, a lens driver includes a first coil and a second coil that are disposed in a substrate that extends in a first direction and a second direction, and spaced apart from each other along the first direction, a sensing portion that overlaps an area in a third direction that is perpendicular to the first direction and the second direction, the area disposed below the first coil and the second coil in the second direction, a first magnet that faces the first coil along the third direction, and a second magnet that faces the second coil along the third direction.

The sensing portion may overlap an area along the third direction, the area disposed below the first magnet and the second magnet in the second direction.

The sensing portion may be disposed on a plane that faces the first magnet and the second magnet of the substrate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
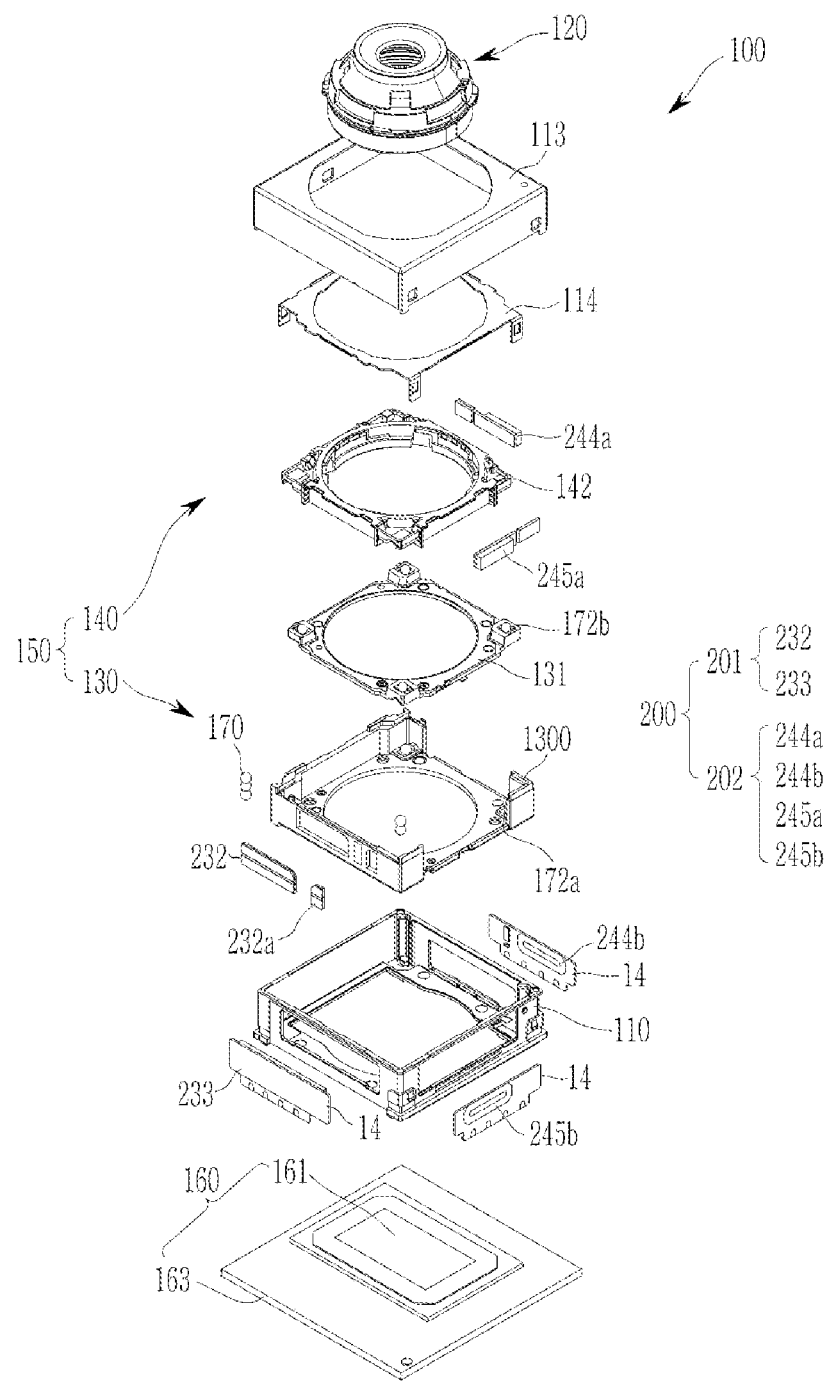
FIG. 1 is a schematic exploded perspective view of a camera module according to an embodiment.

Hereinafter, while example embodiments of the present disclosure will be described in detail with reference to the accompanying drawings as follows, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Further, throughout the specification, the phrase "on a plane" means viewing a target portion from the top, and the phrase "on a cross-section" means viewing a cross-section formed by vertically cutting a target portion from the side.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

Embodiments described herein may provide a lens driver that can be provided in a thin form while maintaining a driving force for lens movement.

However, the problems to be solved by the embodiments described herein are not limited to the above-described problems and may be variously expanded in the range of the technical ideas included in the embodiments.

According to the embodiments described herein, it may be possible to provide a lens driver that can be implemented in a thin form while maintaining a driving force for lens movement.

However, the effects of the embodiments are not limited to the above-described effects, and it is apparent that the embodiments can be variously expanded within a range that does not deviate from the spirit and region of this disclosure.

Referring to FIG. 1, a camera module according to an embodiment will be described. FIG. 1 is a schematic exploded perspective view of a camera module according to an embodiment.

Referring to FIG. 1, a camera module 100 according to an embodiment includes a lens barrel 120, a lens driver 150 that moves the lens barrel 120, an image sensor unit 160 that converts light incident through the lens barrel 120 to an electrical signal, and a housing 110 and a cover 113 that receive the lens barrel 120 and the lens driver 150.

The lens driver 150 is a device for moving the lens barrel 120, and may include a focus adjustment unit 130 for adjusting focus and a shake correction unit 140 for correcting shake.

The lens barrel 120 is received in a lens holder 142, and thus may be accommodated in the focus adjustment unit 130 together with a guide member 131.

The focus adjustment unit 130 may include a carrier 1300 accommodating the lens barrel 120 and a focus adjustment driving portion generating a driving force to move the lens barrel 120 and the carrier 1300 in an optical axis direction.

The focus adjustment driving portion may include a first lens driver 201 including a magnet 232 and a coil 233. The magnet 232 of the first lens driver 201 may be mounted on one surface of the carrier 1300, and the coil 233 may be formed in a substrate 14 and mounted on the housing 110. The focus adjustment driving portion may include a second magnet 232a sensed by a sensing portion to sense movement of the lens barrel 120.

When power is applied to the coil 233, the carrier 1300 may be moved in the optical axis direction by the electromagnetic influence between the magnet 232 and the coil 233. Since the lens barrel 120 is accommodated in the carrier 1300, the lens barrel 120 is also moved in the optical axis direction by the movement of the carrier 1300.

When the carrier 1300 is moved, a first rolling member 170 may be disposed between the carrier 1300 and the housing 110 to reduce friction between the carrier 1300 and the housing 110.

A guide groove may be formed in the carrier 1300 and thus the first rolling member 170 is accommodated and guided in the optical axis direction.

The shake compensation unit 140 includes the guide member 131 guiding the movement of the lens barrel 120 and a shake compensation driving portion generating a driving force to move the guide member 131 in a direction perpendicular to the optical axis direction.

The guide member 131 and the lens holder 142 are inserted into the carrier 1300 and disposed in the optical axis direction, and serve to guide the movement of the lens barrel 120. The lens holder 142 may have an approximately rectangular frame shape. Magnets 244a and 245a for image stabilization may be disposed on two adjacent sides of the lens holder 142. A stopper 114 may be further disposed on an upper portion of the lens barrel 120 to prevent separation of the lens holder 142 from the interior space of the carrier 1300, and the stopper 114 may be coupled to the carrier 1300.

The shake compensation driver may include a second lens driver 202, and the second lens driver 202 may include the magnets 244a and 245a, and coils 244b and 245b. The magnets 244a and 245a of the second lens driver 202 are mounted on the lens holder 142, and the coils 244b and 245b facing the magnets 244a and 245a, respectively, are formed on the substrate 14, and thus they can be fixed to the housing 110.

A plurality of second ball members 172a and a plurality of third ball members 172b may be provided to support the shake correction unit 140, and the plurality of second ball members 172a and the plurality of third ball members 172b function to guide the lens holder 142 during the shake compensation process. In addition, the plurality of second ball members 172a and the plurality of third ball members 172b also functions to maintain a distance between the carrier 1300 and the lens holder 142.

The image sensor unit 160 is a device that converts light incident through the lens barrel 120 into an electrical signal. For example, the image sensor unit 160 may include an image sensor 161 and a printed circuit board 163 connected to the image sensor 161, and may further include an infrared filter. The infrared filter blocks light in an infrared region among the light incident through the lens barrel 120.

The image sensor 161 converts the light incident through the lens barrel 120 into an electrical signal. For example, the image sensor 161 may be a charge coupled device (CCD) or a complementary metal-oxide semiconductor (CMOS). The electrical signal converted by the image sensor 161 is output as an image through a display unit of a portable electronic device. The image sensor 161 is fixed to the printed circuit board 163 and may be electrically connected to the printed circuit board 163.

The lens barrel 120 and the lens driver are accommodated in a space inside the housing 110, and, for example, the housing 110 may have a box shape with an open top and an open bottom. The image sensor unit 160 is disposed in a lower portion of the housing 110.

A stopper 114 may be further disposed on an upper portion of the lens barrel 120 to prevent separation of the guide member 131 and the lens holder 142 from the interior space of the carrier 1300, and the stopper 114 may be combined with the carrier 1300.

The cover 113 is combined with the housing 110 to cover the outer surface of the housing 110, and functions to protect the internal components of a camera module. In addition, the cover 113 may function to shield electromagnetic waves. For example, the cover 113 may shield electromagnetic waves and thus electromagnetic waves generated by the camera module do not affect other electronic components in the portable electronic device.

In addition, since the portable electronic device is equipped with several electronic components in addition to the camera module, the cover 113 may shield electromagnetic waves such that electromagnetic waves generated from these electronic components do not affect the camera module. The cover 113 may be provided as a metal material and may be grounded to the ground pad provided on the printed circuit board 163, thereby shielding electromagnetic waves.

The coil 233 of the focus adjustment driving portion and the coils 244b and 245b of the shake compensation driving portion are embedded in the substrate 14 such that they may be formed as parts of the substrate 14. In addition, the coil 233 of the focus adjustment driving portion and the coils 244b and 245b of the shake compensation driving portion may be embedded together in one substrate 14. In addition, the focus adjustment driving portion and the shake compensation driving portion each may further include a sensing portion that senses movement of the lens barrel 120, and the sensing portions of the focus adjustment driving portion and the shake compensation driving portion may be provided in the form of an IC package that can be controlled by the image sensor 161 and a controller connected to the image sensor 161.

Hereinafter, the lens driver 200 including the above-described first lens driver 201 and second lens driver 202 will be described in more detail.

Figure 2:
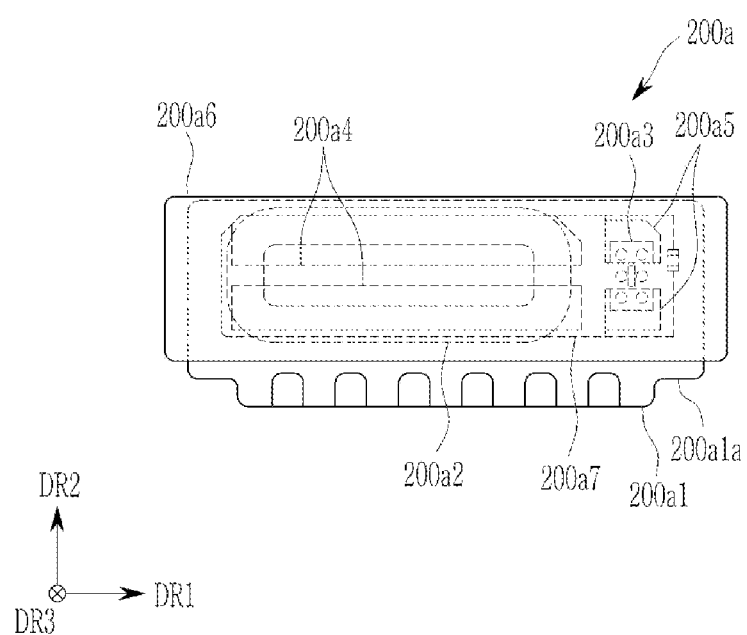
FIG. 2 is a front view of a lens driver according to an embodiment.
Figure 3:
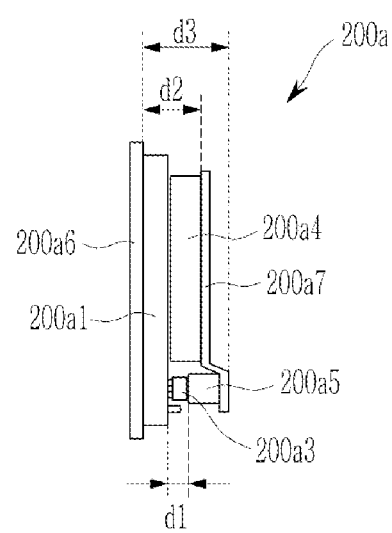
FIG. 3 is a top side view of FIG. 2 viewed from above.
Figure 3:
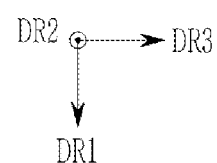

Referring to FIG. 2 and FIG. 3, the lens driver according to the embodiment will be described. FIG. 2 is a front view of a lens driver according to an embodiment, and FIG. 3 is a top side view of FIG. 2 viewed from above.

Referring to FIG. 2 and FIG. 3, a lens driver 200a according to the present embodiment may include a substrate 200a1, a coil 200a2, a sensing portion 200a3, a first magnet 200a4, a second magnet 200a5, a first yoke 200a6, and a second yoke 200a7.

The coil 200a2 may be formed in the substrate 200a1, and, for example, the coil 200a2 may be a winding coil embedded in the interior of the substrate 200a1, or may be a fine pattern (FP) coil.

The substrate 200a1 may have a trench 200a1a formed in a lower portion of an edge of the substrate 200a1 parallel to a second direction DR2. The trench 200a1a of the substrate 200a1 may be disposed on both sides of the substrate 200a1.

The sensing portion 200a3 may be a sensor such as a Hall sensor, may be disposed outside the substrate 200a1, may not overlap the coil 200a2 along the first direction DR1 and the second direction DR2 in which the substrate 200a1 extends, and may not overlap the coil 200a2 along a third direction that is perpendicular to the first direction DR1 and the second direction DR2.

The first magnet 200a4 and the second magnet 200a5 are separated from each other. The first magnet 200a4 may be disposed to face the coil 200a2 along the third direction DR3, and the second magnet 200a5 may face the sensing portion 200a3 along the third direction DR3.

In the third direction DR3, the second magnet 200a5 may be spaced more apart from the substrate 200a1 than the first magnet 200a4, and a distance between the substrate 200a1 and the second magnet 200a5 may be larger than a distance between the substrate 200a1 and the first magnet 200a4 by a first distance d1.

Along the third direction DR3, the surface of the first magnet 200a4 and the surface of the second magnet 200a5 are disposed to have a height difference.

The first yoke 200a6 and the second yoke 200a7 may fix the first magnet 200a4 and the second magnet 200a5.

The first yoke 200a6 may be disposed on a rear surface of the substrate 200a1, and the second yoke 200a7 may be disposed on rear surfaces of the first magnet 200a4 and the second magnet 200a5.

The second yoke 200a7 is not flat along the first direction DR1, and a portion of the second yoke 200a7 corresponding to the second magnet 200a5 may be protruded along the third direction DR3. Along the third direction DR3, a third distance d3 between a portion of the second yoke 200a7 facing the second magnet 200a5 and the first yoke 200a6 is larger than a second distance d2 between a portion of the second yoke 200a7 facing the first magnet 200a4 and the first yoke 200a6, and a difference between the second distance d2 and the third distance d3 may be approximately equal to the first distance d1.

The sensing portion 200a3 may be disposed between the substrate 200a1 and the second magnet 200a5 along the third direction DR3. The second magnet 200a5 is disposed farther from the substrate 200a1 by the first distance d1 than the first magnet 200a4, and thus a space for disposing the sensing portion 200a3 can be secured between the substrate 200a1 and the second magnet 200a5.

In the lens driver 200a according to the present embodiment, the coil 200a2 is formed in the substrate 200a1, and the second magnet 200a5 facing the sensing portion 200a3 is disposed further away from the substrate 200a1 than the first magnet 200a4 facing the coil 200a2 such that the sensing portion 200a3 can be disposed between the substrate 200a1 and the second magnet 200a5. Through this, the lens driving and sensing operations can be performed together while narrowing the area of a region occupied by the lens driver 200a.

Figure 4:
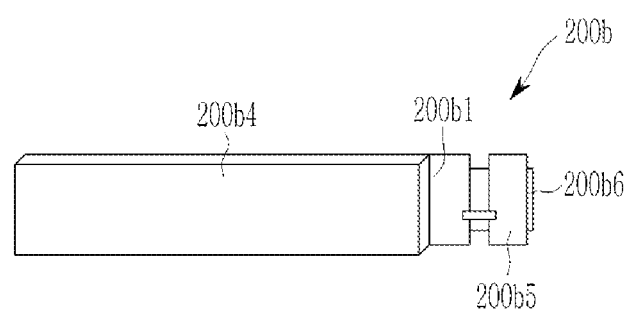
FIG. 4 is an exploded view of a lens driver according to another embodiment.
Figure 4:
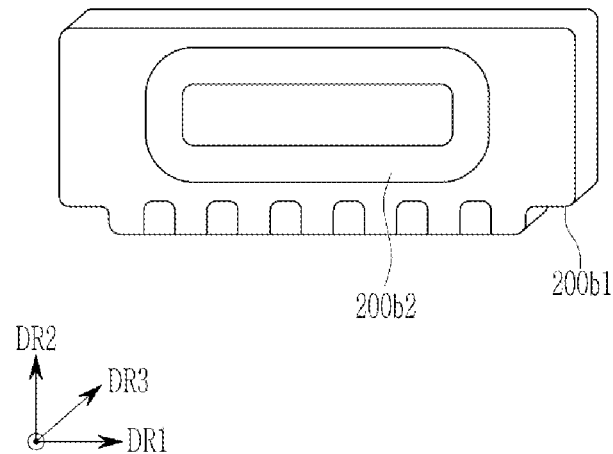
Figure 5:
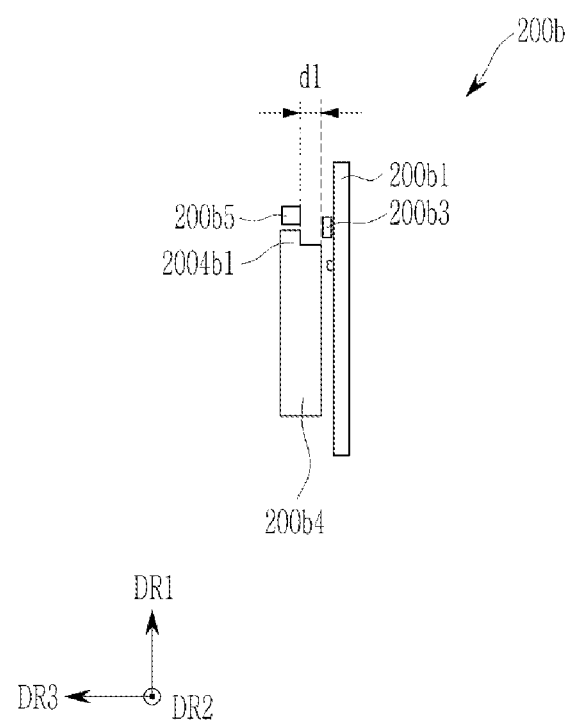
FIG. 5 is a view of FIG. 4 viewed from above.

Referring to FIG. 4 and FIG. 5, a lens driver 200b according to another embodiment will be described.

FIG. 4 is an exploded view of a lens driver according to another embodiment, and FIG. 5 is a view of FIG. 4 viewed from above.

Referring to FIG. 4 and FIG. 5, a lens driver 200b according to the present embodiment may include a substrate 200b1, a coil 200b2, a sensing portion 200b3, a first magnet 200b4, a second magnet 200b5, and a yoke 200b6.

The coil 200b2 may be formed in the substrate 200b1, and the coil 200b2 may be a winding coil embedded in the substrate 200b1 or may be a fine pattern (FP) coil.

The sensing portion 200b3 may be a sensor such as a Hall sensor, may be disposed outside the substrate 200b1, may not overlap the coil 200b2 along a first direction DR1 and a second direction DR2 in which the substrate 200b1 extends, and may not overlap the coil 200b2 along a third direction that is perpendicular to the first direction DR1 and the second direction DR2.

The first magnet 200b4 may substantially face the coil 200b2 along the third direction DR3, and the first magnet 200b4 may include a portion 2004b1 facing the sensing portion 200b3. The portion 2004b1 of the first magnet 200b4 and the second magnet 200b5 disposed apart from each other, and the portion 2004b1 of the first magnet 200b4 and the second magnet 200b5 may face the sensing portion 200b3 along the third direction DR3.

The first magnet 200b4 may drive the lens together with the coil 200b2, and the portion 2004b1 of the first magnet 200b4 and the second magnet 200b5 may be used for the sensing operation of the sensing portion 200b3.

Unlike the lens driver 200a according to the embodiment described above with reference to FIG. 2 and FIG. 3, in the lens driver 200b according to the present embodiment, a yoke 200b6 disposed to a rear surface of the first magnet 200b4 and the second magnet 200b5 may have a flat surface.

However, along the third direction DR3, a height of the portion 2004b1 of the first magnet 200b4 and second magnet 200b5 may be different from a height of the remaining part of the first magnet 200b4, and the sensing portion 200b3 may be disposed to face the portion 2004b1 of the first magnet 200b4 and the second magnet 200b5 having a relatively low height. The remaining part of the first magnet 200b4 may include the first magnet 200b4 except for the portion 2004b1 of the first magnet 200b4.

A thickness of the portion 2004b1 of the first magnet 200b4 may be smaller than a thickness of the remaining part of the first magnet 200b4 by a first distance d1, and a thickness of the portion 2004b1 of the first magnet 200b4 and a thickness of the second magnet 200b5 may be almost equal to each other. Since the thickness of the portion 2004b1 of the first magnet 200b4 and the second magnet 200b5 are relatively thinner than that of the rest of the first magnet 200b4, a region where the sensing portion 200b3 disposed between the substrate 200b1 and the portion 2004b1 of the first magnet 200b4 and the second magnet 200b5 is disposed may be secured.

In the lens driver 200b according to the present embodiment, the coil 200b2 is formed in the substrate 200b1, and the thickness of the portion 2004b1 of the first magnet 200b4 and the second magnet 200b5 facing the sensing portion 200b3 formed to be smaller than that of the remaining part of the first magnet 200b4 facing the coil 200b2 such that the sensing portion 200b3 can be disposed between the substrate 200b1 and the portion 2004b1 of the first magnet 200b4 and the second magnet 200b5. Through this, the lens driving and sensing operations can be performed together while narrowing the area of the region occupied by the lens driver 200b.

Figure 6:
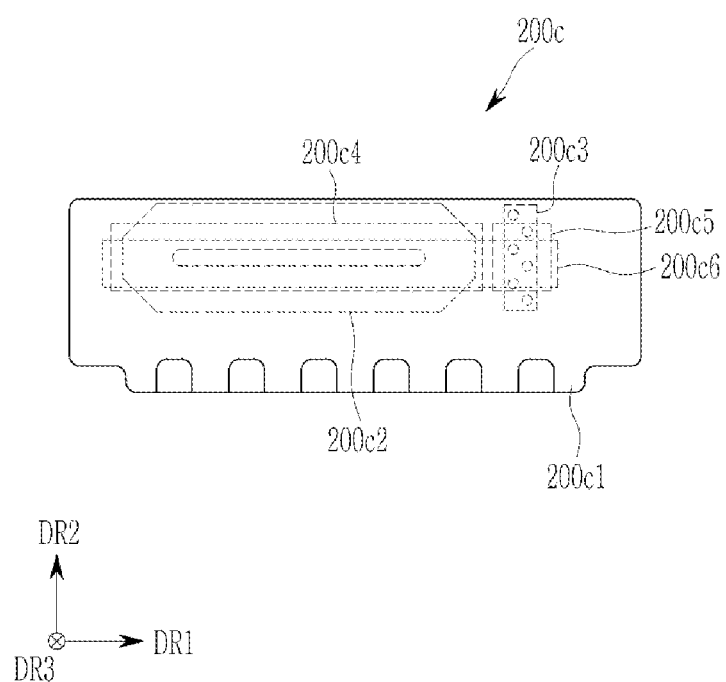
FIG. 6 is a front view of a lens driver according to another embodiment.
Figure 7:
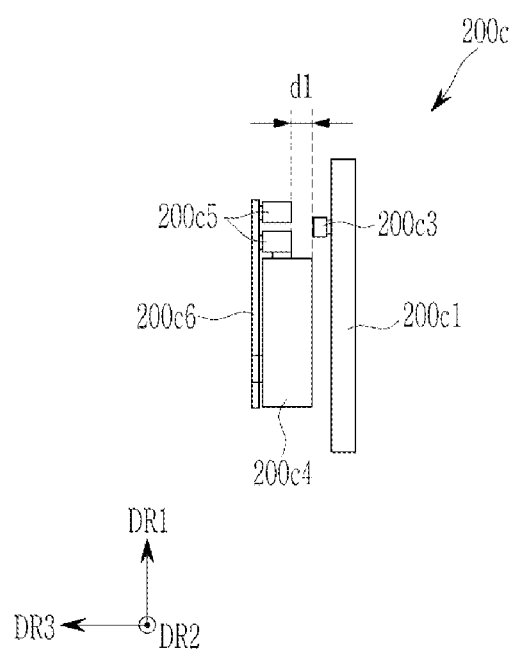
FIG. 7 is a top view of FIG. 6.

Referring to FIG. 6 and FIG. 7, a lens driver 200c according to another embodiment will be described. FIG. 6 is a front view of a lens driver according to another embodiment, and FIG. 7 is a top view of FIG. 6.

Referring to FIG. 6 and FIG. 7, a lens driver 200c according to the present embodiment may include a substrate 200c1, a coil 200c2, a sensing portion 200c3, a first magnet 200c4, a second magnet 200c5, and a yoke 200c6.

The coil 200c2 may be formed in the substrate 200c1, and the coil 200c2 may be a winding coil embedded in the interior of the substrate 200c1, or may be a fine pattern (FP) coil.

The sensing portion 200c3 may be a sensor such as a Hall sensor, may be disposed outside the substrate 200c1, may not overlap the coil 200c2 along the first direction DR1 and the second direction DR2 in which the substrate 200c1 extends, and may not overlap the coil 200c2 along a third direction that is perpendicular to the first direction DR1 and the second direction DR2.

The first magnet 200c4 may face the coil 200c2 along the third direction DR3, and the second magnet 200c5 may face the sensing portion 200c3 along the third direction DR3. The second magnet 200c5 may include two magnets of different polarizations that are spaced apart from each other and disposed.

The first magnet 200c4 may drive the lens together with the coil 200c2, and the second magnet 200c5 may be used for the sensing operation of the sensing portion 200c3.

Unlike the lens driver 200a according to the embodiment described above with reference to FIG. 2 and FIG. 3, in the lens driver 200c, a thickness of the first magnet 200c4 is thicker by a first distance d1 than that of the second magnet 200c5, and the yoke 200c6 disposed to rear surfaces of the first magnet 200c4 and the second magnet 200c5 may have a flat surface.

However, a height of the first magnet 200c4 and a height of the second magnet 200c5 may be different along the third direction DR3, and the sensing portion 200a3 may be disposed to face the second magnet 200c5 having a relatively low height.

As such, since the thickness of the second magnet 200c5 is relatively thinner than that of the first magnet 200c4, a region in which the sensing portion 200c3 is disposed can be secured between the substrate 200c1 and the second magnet 200c5.

In the lens driver 200c according to the present embodiment, the coil 200c2 is formed in the substrate 200c1 and the second magnet 200c5 facing the sensing portion 200c3 is formed to be thinner than the first magnet 200c4 facing the coil 200c2, and thus the sensing portion 200c3 can be disposed between the substrate 200c1 and the second magnet 200c5. Through this, the lens driving and sensing operations can be performed together while narrowing the area of the region occupied by the lens driver 200c.

Figure 8:
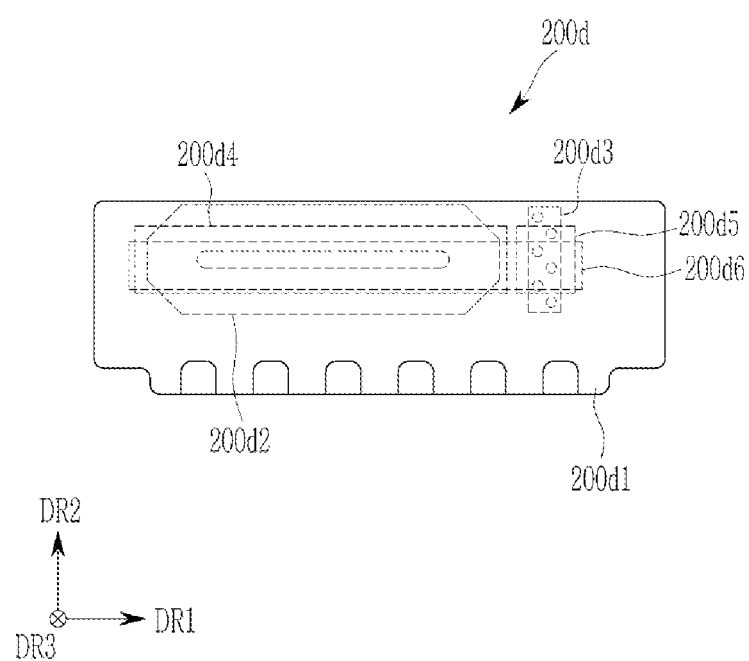
FIG. 8 is a front view of a lens driver according to another embodiment.
Figure 9:
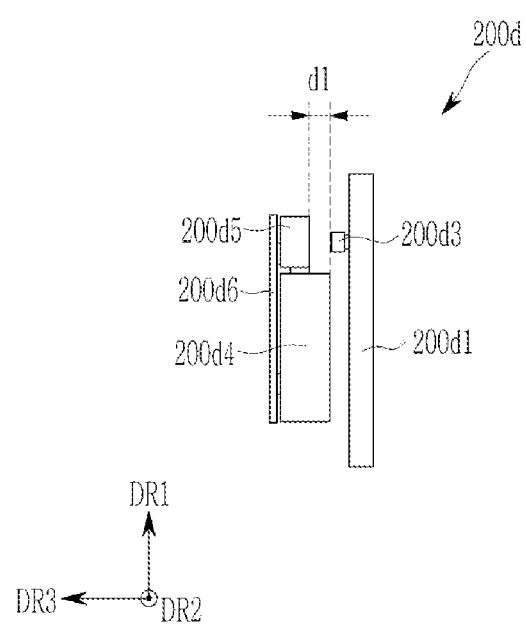
FIG. 9 is a top view of FIG. 8.

Referring to FIG. 8 and FIG. 9, a lens driver 200d according to another embodiment will be described. FIG. 8 is a front view of a lens driver according to another embodiment, and FIG. 9 is a top view of FIG. 8.

Referring to FIG. 8 and FIG. 9, a lens driver 200d according to the present embodiment may include a substrate 200d1, a coil 200d2, a sensing portion 200d3, a first magnet 200d4, a second magnet 200d5, and a yoke 200d6.

The coil 200d2 may be formed in the substrate 200d1, and the coil 200d2 may be a winding coil embedded in the interior of the substrate 200d1, or may be a fine pattern (FP) coil.

The sensing portion 200d3 may be a sensor such as a Hall sensor, may be disposed outside the substrate 200d1, may not overlap the coil 200d2 along a first direction DR1 and a second direction DR2 in which the substrate 200d1 extends, and may not overlap the coil 200d2 along a third direction that is perpendicular to the first direction DR1 and the second direction DR2.

The first magnet 200d4 may face the coil 200d2 along the third direction DR3, and the second magnet 200d5 may face the sensing portion 200d3 along the third direction DR3. The second magnet 200d5 may be one magnet of one polarization, and the first magnet 200d4 and the second magnet 200d5 may be magnets of different polarizations.

The first magnet 200d4 may drive the lens together with the coil 200d2, and the second magnet 200d5 may be used for the sensing operation of the sensing portion 200d3.

Unlike the lens driver 200a according to the embodiment described above with reference to FIG. 2 and FIG. 3, in the lens driver 200d, a thickness of the first magnet 200d4 is thicker by a first distance d1 than that of the second magnet 200d5, and the yoke 200d6 disposed to rear surfaces of the first magnet 200d4 and the second magnet 200d5 may have a flat surface.

However, a height of the first magnet 200d4 and a height of the second magnet 200d5 may be different along the third direction DR3, and the sensing portion 200d3 may be disposed to face the second magnet 200d5 having a relatively low height.

As such, since the thickness of the second magnet 200d5 is relatively thinner than that of the first magnet 200d4, a region in which the sensing portion 200d3 is disposed can be secured between the substrate 200d1 and the second magnet 200d5.

In the lens driver 200d according to the present embodiment, the coil 200d2 is formed in the substrate 200d1 and the second magnet 200d5 facing the sensing portion 200d3 is formed to be thinner than the first magnet 200d4 facing the coil 200d2, and thus the sensing portion 200d3 can be disposed between the substrate 200d1 and the second magnet 200d5. Through this, the lens driving and sensing operations can be performed together while narrowing the area of the region occupied by the lens driver 200d.

Figure 10:
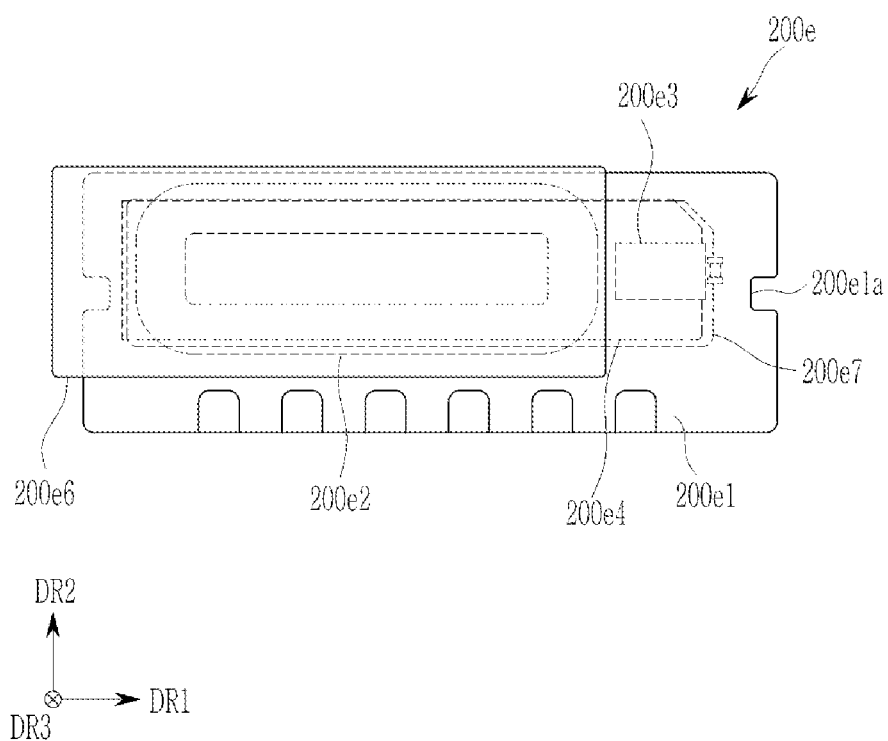
FIG. 10 is a front view of a lens driver according to another embodiment.

Referring to FIG. 10, a lens driver 200e according to another embodiment will be described. FIG. 10 is a front view of a lens driver according to another embodiment.

Referring to FIG. 10, a lens driver 200e according to the present embodiment is similar to the lens driver 200a according to the embodiment described above with reference to FIG. 2 and FIG. 3.

A lens driver 200e according to the present embodiment includes a substrate 200e1, a coil 200e2, a sensing portion 200e3, a magnet 200e4, a first yoke 200e6, and a second yoke 200e7.

The coil 200e2 may be formed in the substrate 200e1, and for example, the coil 200e2 may be a winding coil embedded in the substrate 200e1, or may be an FP (Fine Pattern) coil.

The sensing portion 200e3 may be a sensor such as a Hall sensor, may be disposed outside the substrate 200e1, may not overlap the coil 200e2 along a first direction DR1 and a second direction DR2 in which the substrate 200e1 extends, and may not overlap the coil 200e2 along a third direction that is perpendicular to the first direction DR1 and the second direction DR2.

Unlike the lens driver 200a according to the embodiment described above with reference to FIG. 2 and FIG. 3, the lens driver 200e according to the present embodiment may include one magnet 200e4, and the magnet 200e4 may face the coil 200e2 and the sensing portion 200e3 along the third direction DR3.

The first yoke 200e6 and the second yoke 200e7 may fix the magnet 200e4.

The first yoke 200e6 may be disposed on the substrate 200e1, and the second yoke 200e7 may be disposed on the magnet 200e4

The first yoke 200e6 may be removed from a portion facing the sensing portion 200e3 so as to not face the sensing portion 200e3 along the third direction DR3.

The sensing portion 200e3 may be disposed between the substrate 200e1 and the magnet 200e4 along the third direction DR3.

An edge of the substrate 200e1 parallel to the second direction DR2 may have a trench 200e1a. The trench 200e1a may be formed adjacent to the center of the edge of substrate 200e1 along the second direction DR2.

In the lens driver 200e according to the present embodiment, the coil 200e2 is formed in the substrate 200e1 and one magnet 200e4 is used to drive the coil 200e2 and the sensing portion 200a3, thereby narrowing the area of the region occupied by the lens driver 200e and at the same time performing the lens driving and sensing operations.

Figure 11:
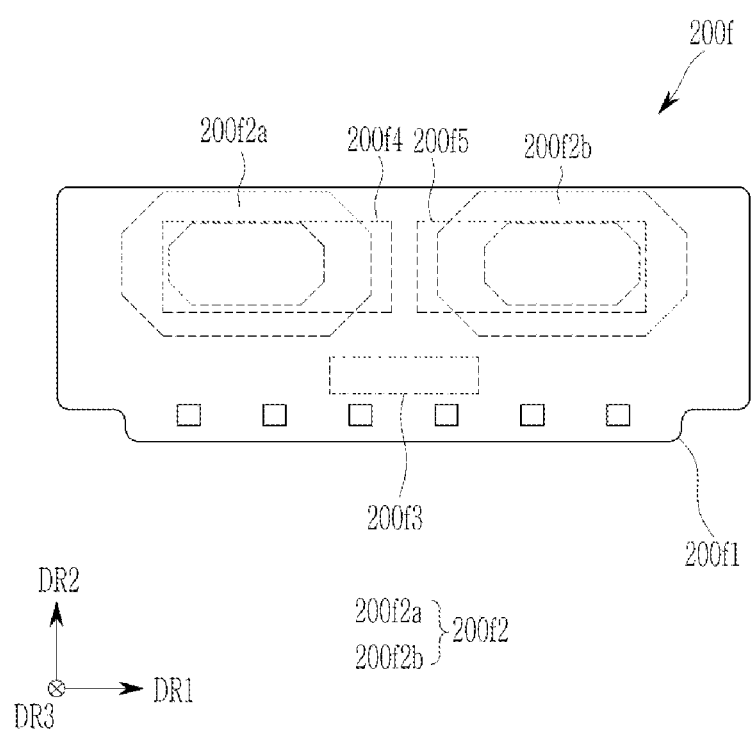
FIG. 11 is a front view of a lens driver according to another embodiment.
Figure 12:
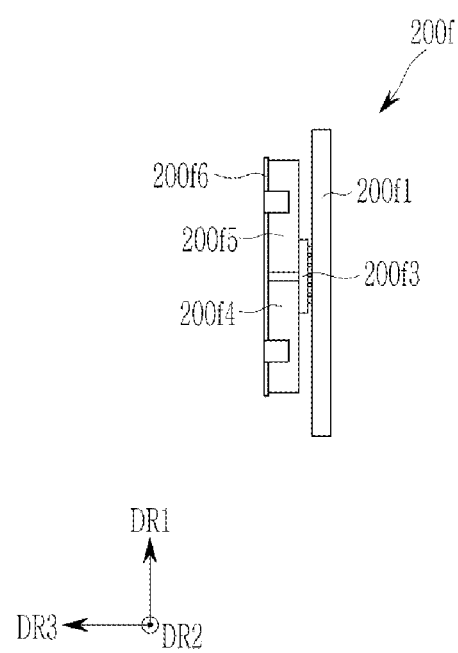
FIG. 12 is a top view of FIG. 11.

Referring to FIG. 11 and FIG. 12, a lens driver 200f according to another embodiment will be described. FIG. 11 is a front view of a lens driver according to another embodiment, and FIG. 12 is a top view of FIG. 11.

Referring to FIG. 11 and FIG. 12, a lens driver 200f according to the present embodiment may include a substrate 200f1, a coil 200f2, a sensing portion 200f3, a first magnet 200f4, a second magnet 200f5, and a yoke 200f6.

The coil 200f2 may include a first coil 200f2a and a second coil 200f2b spaced apart from each other, the first coil 200f2a and the second coil 200f2b may be formed in the substrate 200f1, and the first coil 200f2a and the second coil 200f2b may be winding coils embedded in the interior of the substrate 200f1, or may be FP (Fine Pattern) coils.

The sensing portion 200f3 may be a sensor such as a Hall sensor, may be disposed outside the substrate 200f1, and may be disposed under the first coil 200f2a and the second coil 200f2b along the second direction DR2.

The first magnet 200f4 may face the first coil 200f2a of the coil 200f2 along the third direction DR3, and the second magnet 200f5 may face the second coil 200f2b of the coil 200f2 along the third direction DR3.

The sensing portion 200f3 may be disposed under the first magnet 200f4 and the second magnet 200f5 along the second direction DR2.

A distance between the first magnet 200f4 and the second magnet 200f5 and the sensing portion 200f3 is adjusted such that the first magnet 200f4 and the second magnet 200f5 can drive the lens together with the coil 200f2 and can be simultaneously used for sensing.

In the lens driver 200f according to the present embodiment, the coil 200f2 is formed in the substrate 200f1, and the sensing portion 200f3 is disposed under the first magnet 200f4 and the second magnet 200f5 and under the coil 200f2 such that the first magnet 200f4 and the second magnet 200f5 can drive the lens together with the coil 200f2 and can be simultaneously used for the sensing operation of the sensing portion 200f3. Through this, the lens driving and sensing operations can be performed together while narrowing the area of the region occupied by the lens driver 200f.

Figure 13:
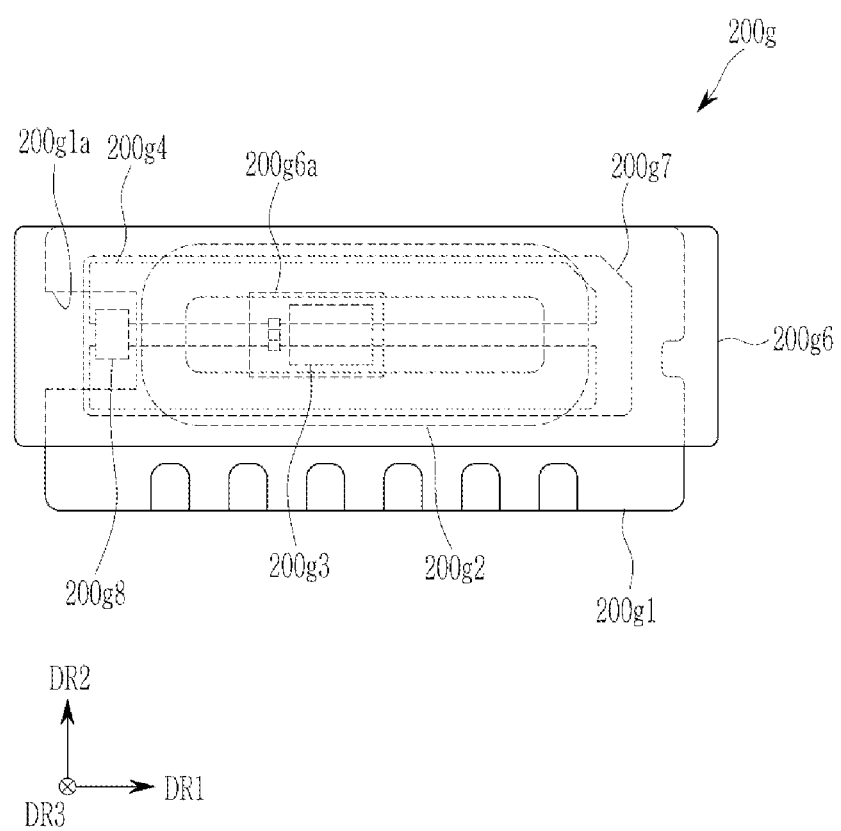
FIG. 13 is a front view of a lens driver according to another embodiment.

Referring to FIG. 13, a lens driver 200g according to another embodiment will be described. FIG. 13 is a front view of a lens driver according to another embodiment.

Referring to FIG. 13, a lens driver 200g according to the present embodiment may include a substrate 200g1, a coil 200g2, a sensing portion 200g3, a magnet 200g4, a first yoke 200g6, a second yoke 200g7, and a sub-yoke 200g8.

The coil 200g2 may be formed in the substrate 200g1, the coil 200g2 may be a winding coil embedded in the interior of the substrate 200g1, and may be an FP (Fine Pattern) coil.

The sensing portion 200g3 may be disposed inside the coil 200g2 of the substrate 200g1. The sensing portion 200g3 may be a sensor such as a Hall sensor.

The substrate 200g1 has a trench 200g1a, and the first yoke 200g6 disposed on a rear side of the substrate 200g may have a hole 200g6a.

The first yoke 200g6 may be disposed such that the hole 200g6a overlaps the sensing portion 200g3 along the third direction DR3.

The trench 200g1a of the substrate 200g1 may overlap with the sub-yoke 200g8. The sub-yoke 200g8 may be a yoke that centers the position, and when the position of the lens driver 200g is out of the center position, the sub-yoke 200g8 may locate the position of the lens driver 200g to its original position by the magnetic force of the magnet 200g4.

In the lens driver 200g according to the present embodiment, the coil 200g2 is formed in the substrate 200g1 and the sensing portion 200g3 is disposed inside the coil 200g2, and the lens driving and sensing operations can be performed while narrowing the region occupied by the lens driver 200g.

Figure 14:
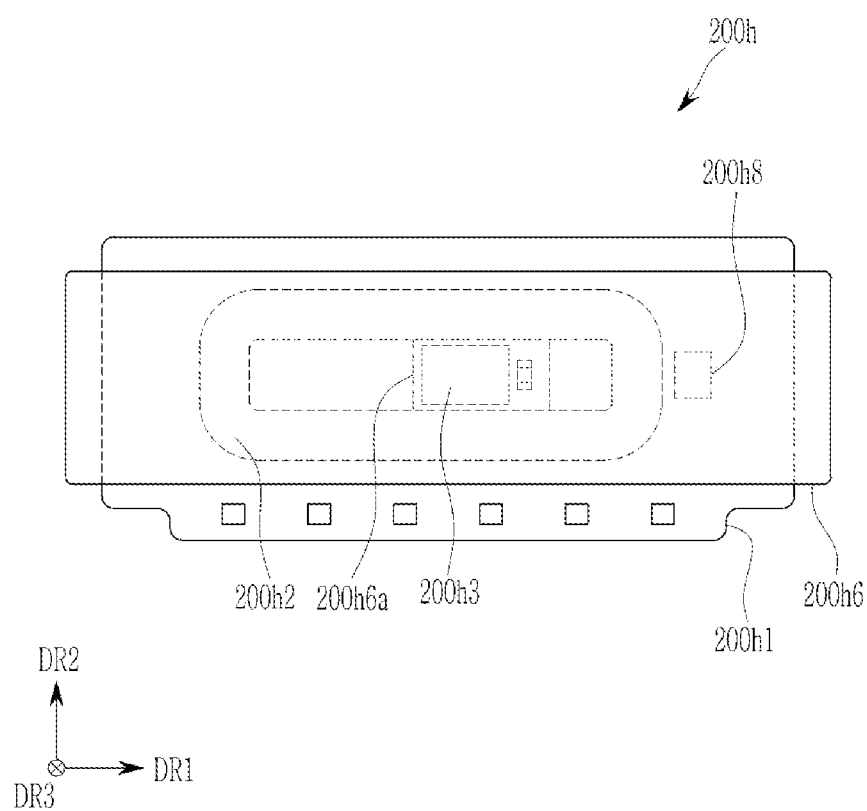
FIG. 14 is a front view of a lens driver according to another embodiment.

Referring to FIG. 14, a lens driver 200h according to another embodiment will be described. FIG. 14 is a front view of a lens driver according to another embodiment.

Referring to FIG. 14, a lens driver 200h according to the present embodiment may include a substrate 200h1, a coil 200h2, a sensing portion 200h3, a yoke 200h6, and a sub-yoke 200h8.

The coil 200h2 may be formed in the substrate 200h1, and the coil 200h2 may be a winding coil embedded in the interior of the substrate 200h1, and may be an FP (Fine Pattern) coil.

The sensing portion 200h3 may be disposed inside the coil 200h2 of the substrate 200h1. The sensing portion 200h3 may be a sensor such as a Hall sensor.

The yoke 200*h*6 has a hole 200*h*6*a*, and the hole 200*h*6*a* of the yoke 200*h*6 may overlap the sensing portion 200*h*3 along the third direction DR3.

The sub-yoke 200*g*8 may be inserted into the yoke 200*h*6 disposed on the rear side of the substrate 200*h*1. The sub-yoke 200*g*8 may be mounted in the yoke 200*h*6 disposed on the rear side of the substrate 200*h*1 by laser welding, metal drawing, or forced press-fitting.

The sub-yoke 200*h*8 may be a yoke that centers the center position.

Although not shown, the lens driver 200*h* according to the present embodiment may further include a magnet and a yoke facing the coil 200*h*2. The magnet and yoke may be similar to the magnet and yoke of the lens drivers according to the above-described embodiments.

In the lens driver 200*h* according to the present embodiment, the coil 200*h*2 is formed in the substrate 200*h*1, the sensing portion 200*h*3 is disposed inside the coil 200*h*2, and the sub-yoke 200*h*8 is inserted into the yoke 200*h*6 disposed on the rear surface of the substrate 200*h*1, thereby performing the lens driving and sensing operations together while narrowing the area of the region occupied by the lens driver 200*h*.

Figure 15:
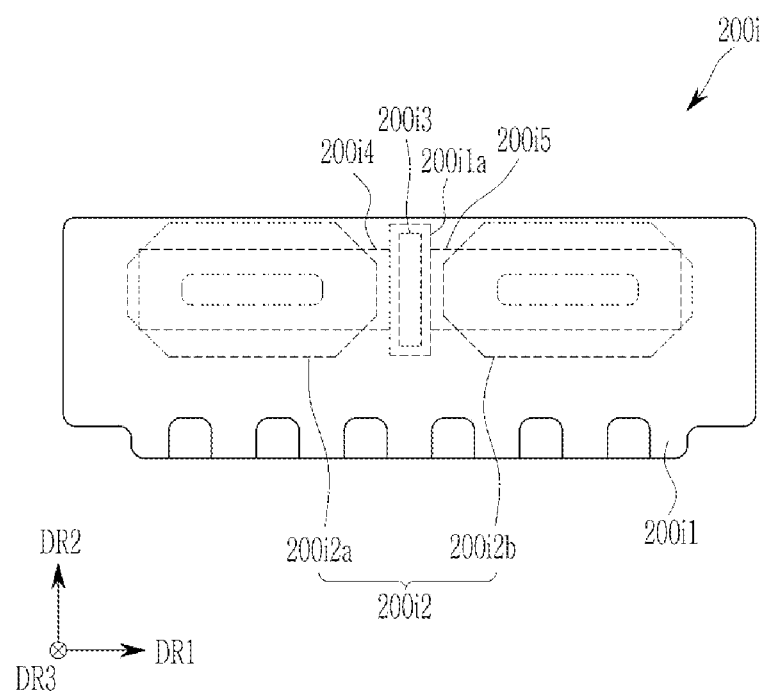
FIG. 15 is a front view of a lens driver according to another embodiment.
Figure 16:
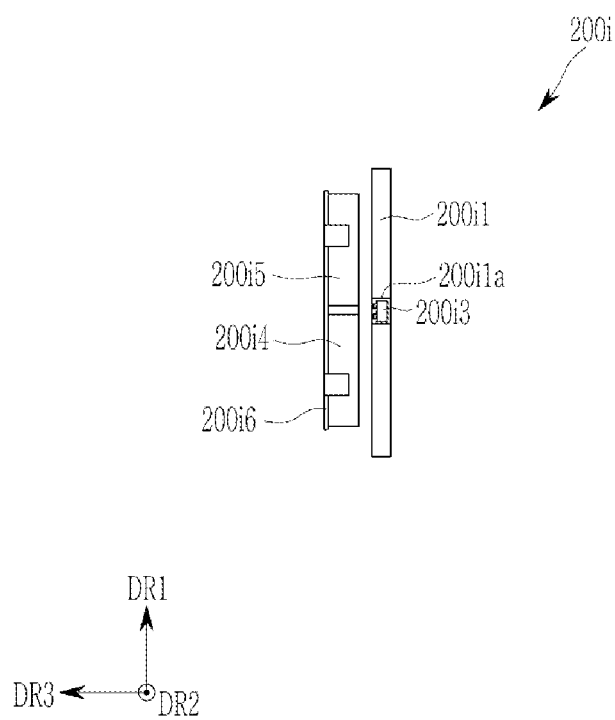
FIG. 16 is a top view of FIG. 15.

Referring to FIG. 15 and FIG. 16, a lens driver 200*i* according to another embodiment will be described. FIG. 15 is a front view of a lens driver according to another embodiment, and FIG. 16 is a top view of FIG. 15.

Referring to FIG. 15 and FIG. 16, a lens driver 200*i* according to the present embodiment may include a substrate 200*i*1, a coil 200*i*2, a sensing portion 200*i*3, a first magnet 200*i*4, a second magnet 200*i*5, and a yoke 200*i*6.

The coil 200*i*2 may include a first coil 200*i*2*a* and a second coil 200*i*2*b* spaced apart from each other, the first coil 200*i*2*a* and the second coil 200*i*2*b* may be formed in the substrate 200*i*1, and the first coil 200*i*2*a* and the second coil 200*i*2*b* may be winding coils embedded in the interior of the substrate 200*i*1, or may be fine pattern (FP) coils.

The substrate 200*i*1 may have a trench 200*i*1*a*, and the sensing portion 200*i*3 may be disposed in the substrate 200*i*1 in the trench 200*i*1*a*.

The sensing portion 200*i*3 may be a sensor such as a Hall sensor, and may be disposed to face between the first magnet 200*i*4 and the second magnet 200*i*5.

The first magnet 200*i*4 may face the first coil 200*i*2*a* of the coil 200*i*2 along the third direction DR3, and the second magnet 200*i*5 may face the second coil 200*i*2*b* of the coil 200*i*2 along the third direction DR3.

In the lens driver 200*i* according to the present embodiment, the coil 200*i*2 is formed in the substrate 200*i*1, the sensing portion 200*i*3 is disposed inside the coil 200*i*2 in the trench 200*i*1*a* of the substrate 200*i*1, and the sensing portion 200*i*3 is disposed to face between the first magnet 200*i*4 and the second magnet 200*i*5 such that the lens driving and sensing operations can be performed together while narrowing the area occupied by the lens driver 200*i*.

Figure 17:
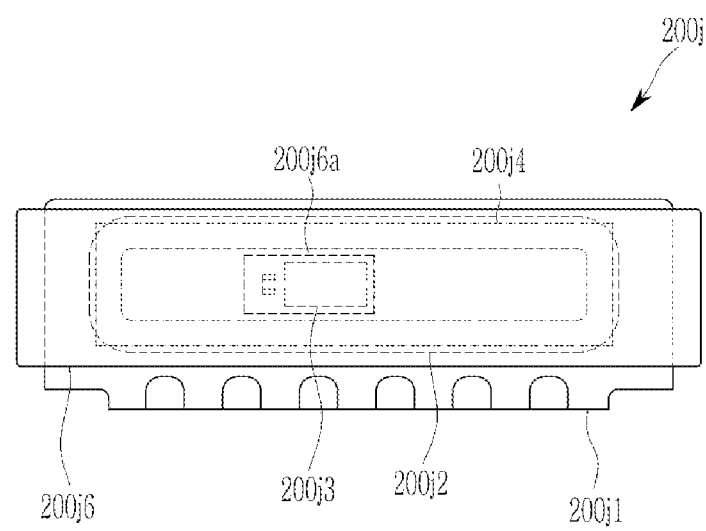
FIG. 17 is a front view of a lens driver according to another embodiment.
Figure 18:
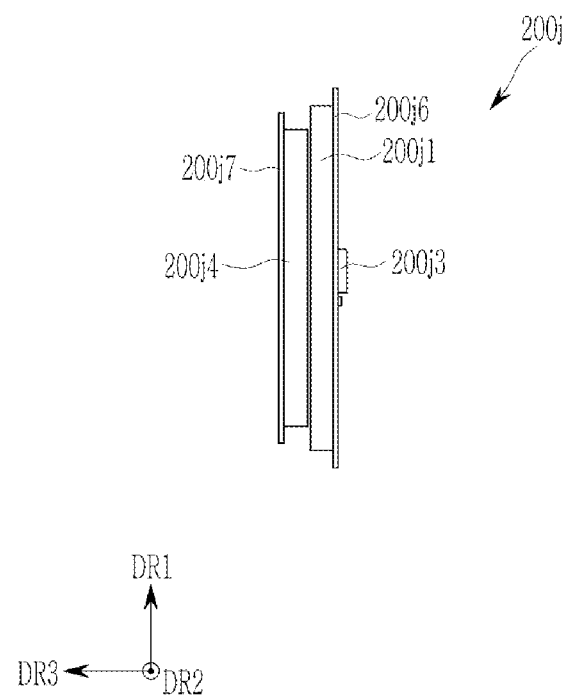
FIG. 18 is a top view of FIG. 17.

Referring to FIG. 17 and FIG. 18, a lens driver 200*j* according to another embodiment will be described. FIG. 17 is a front view of a lens driver according to another embodiment, and FIG. 18 is a top view of FIG. 17.

Referring to FIG. 17 and FIG. 18, a lens driver 200*j* according to the present embodiment may include a substrate 200*j*1, a coil 200*j*2, a sensing portion 200*j*3, a magnet 200*j*4, a first yoke 200*j*6, and a second yoke 200*j*7.

The coil 200*j*2 may be formed in the substrate 200*j*1, and the coil 200*j*2 may be a winding coil embedded in the interior of the substrate 200*j*1, and may be an FP (Fine Pattern) coil.

The sensing portion 200*j*3 may be disposed on the first yoke 200*j*6 disposed on the rear surface of the substrate 200*j*1. The first yoke 200*j*6 may have a hole 200*j*6*a*, and the sensing portion 200*j*3 may face the hole 200*j*6*a* of the first yoke 200*j*6 along the third direction DR3.

The sensing portion 200*j*3 may be a sensor such as a Hall sensor, and the sensing portion 200*j*3 may be disposed to overlap the inside of the coil 200*j*2.

The coil 200*j*2 and the sensing portion 200*j*3 may be disposed to face the magnet 200*j*4, and one magnet 200*j*4 may drive a lens together with the coil 200*j*2 and may be simultaneously used for the sensing operation.

In the lens driver 200*j* according to the present embodiment, the coil 200*j*2 is formed in the substrate 200*j*1, and the sensing portion 200*j*3 is disposed to overlap the hole 200*j*6*a* of the first yoke 200*j*6 on the first yoke 200*j*6 disposed on the rear surface of the substrate 200*j*1, thereby performing the lens driving and sensing operations together, while narrowing the area of the region occupied by lens driver 200*j*.

Figure 19:
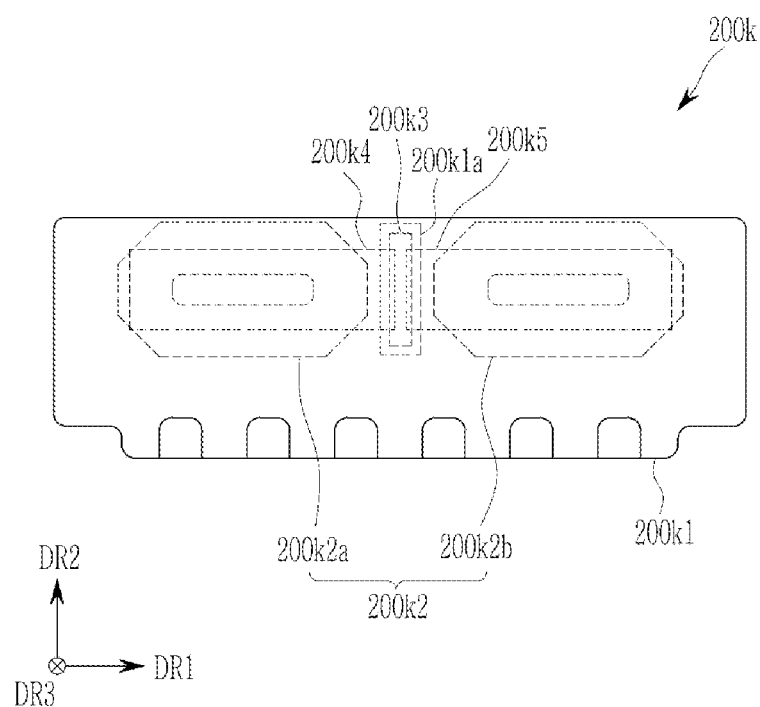
FIG. 19 is a front view of a lens driver according to another embodiment.
Figure 20:
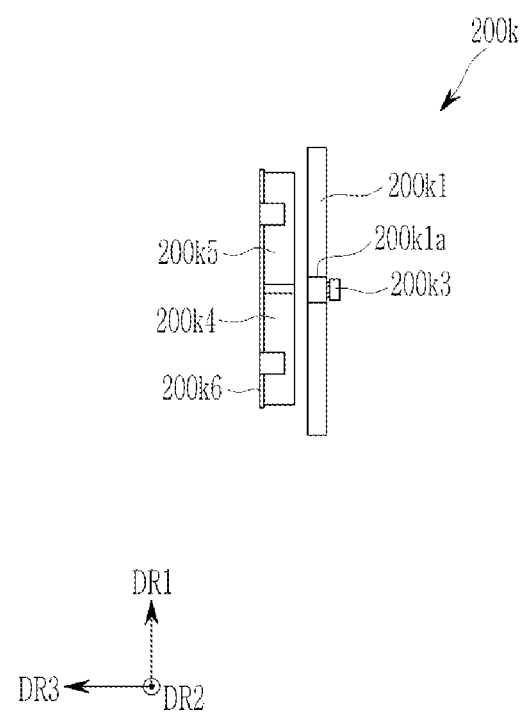
FIG. 20 is a top view of FIG. 19.

Referring to FIG. 19 and FIG. 20, a lens driver 200*k* according to another embodiment will be described. FIG. 19 is a front view of a lens driver according to another embodiment, and FIG. 20 is a top view of FIG. 19.

Referring to FIG. 19 and FIG. 20, a lens driver 200*k* according to the present embodiment may include a substrate 200*k*1, a coil 200*k*2, a sensing portion 200*k*3, a first magnet 200*k*4, a second magnet 200*k*5, and a yoke 200*k*6.

The coil 200*k*2 may include a first coil 200*k*2*a* and a second coil 200*k*2*b* spaced apart from each other, the first coil 200*k*2*a* and the second coil 200*k*2*b* may be formed within the substrate 200*k*1, and the first coil 200*k*2*a* and the second coil 200*k*2*b* may be winding coils embedded in the interior of the substrate 200*k*1, or may be an FP (Fine Pattern) coil.

The sensing portion 200*k*3 may be a sensor such as a Hall sensor, and the sensing portion 200*k*3 may be disposed on the rear surface of the substrate 200*k*1. The substrate 200*k*1 may have a first hole 200*k*1*a*, and the sensing portion 200*k*3 may overlap the first hole 200*k*1*a* of the substrate 200*k*1.

The first magnet 200*k*4 may face the first coil 200*k*2*a* of the coil 200*k*2 along the third direction DR3, and the second magnet 200*k*5 may face the second coil 200*k*2*b* of the coil 200*k*2 along the third direction DR3.

Along the third direction DR3, the sensing portion 200*k*3 may be disposed to face between the first magnet 200*k*4 and the second magnet 200*k*5. In addition, the sensing portion 200*k*3 may overlap the end of the first magnet 200*k*4 and the end of the second magnet 200*k*5.

In the lens driver 200*k* according to the present embodiment, the coil 200*k*2 is formed in the substrate 200*k*1, the sensing portion 200*k*3 is disposed on the back surface of the substrate 200*k*1 to overlap the first hole 200*k*1*a* of the substrate 200*k*1, and thus the lens driving and sensing operations can be performed together while narrowing the area of the region occupied by the lens driver 200*k*.

Figure 21:
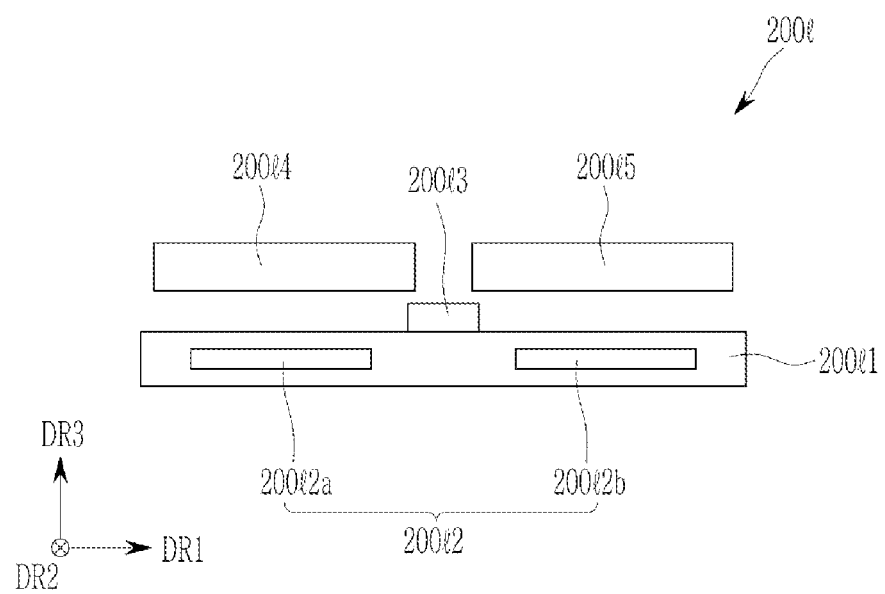
FIG. 21 is a top view of a lens driver according to another embodiment.

Referring to FIG. 21, a lens driver 200*l* according to another embodiment will be described. FIG. 21 is a top view of a lens driver according to another embodiment.

Referring to FIG. 21, a lens driver 200*l* according to an embodiment may include a substrate 200*l*1, a coil 200*l*2, a sensing portion 200*l*3, a first magnet 200*l*4, and a second magnet 200*l*5.

The coil 200*l*2 may include a first coil 200*l*2*a* and a second coil 200*l*2*b* that are spaced apart from each other, the first coil 200*l*2*a* and the second coil 200*l*2*b* may be formed in the substrate 200*l*1, and the first coil 200*l*2*a* and the second coil 200/2b may be winding coils embedded in the interior of the substrate 200/1, or fine pattern (FP) coils.

The sensing portion 200/3 may be a sensor such as a Hall sensor, and may be disposed on the substrate 200/1. More specifically, the sensing portion 200/3 may be disposed on a plane that faces the first magnet 200/4 and the second magnet 200/5 among planes of the substrate 200/1. The sensing portion 200/3 may be disposed to overlap an area between the first coil 200/2a and the second coil 200/2b along the third direction DR3.

The first magnet 200/4 may face the first coil 200/2a of the coil 200/2 along the third direction DR3, and the second magnet 200/5 may face the second coil 200/2b of the coil 200/2 along the third direction DR3.

The sensing portion 200/3 may be disposed to face an area between the first magnet 200/4 and the second magnet 200/5. In addition, the sensing portion 200/3 may overlap an end of the first magnet 200/4 and an end of and the second magnet 200/5.

In the lens driver 200l according to the embodiment, the coil 200/2 is formed in the substrate 200/1 and the sensing portion 200/3 is disposed on the substrate 200/1 such that the lens driving and sensing operations can be performed together while narrowing the area of the region occupied by the lens driver 200l.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driver comprising:
a coil that is disposed on a substrate that extends in a first direction and a second direction;
a sensing portion that is disposed to not overlap the coil along a plane formed by an intersection of the first direction and the second direction;
a first magnet that overlaps the coil along a third direction that is perpendicular to the first direction and the second direction; and
a second magnet that overlaps the sensing portion along the third direction,
wherein a total distance from an upper surface of the substrate to a lower surface of the first magnet along the third direction and a total distance from the upper surface of the substrate to a lower surface of the second magnet along the third direction are different from each other.

2. The lens driver of claim 1, wherein
the sensing portion is disposed between the substrate and the second magnet along the third direction.

3. The lens driver of claim 2, wherein
a thickness of the first magnet and a thickness of the second magnet are equal to each other along the third direction.

4. The lens driver of claim 3, further comprising a yoke that is disposed on rear surfaces of the first magnet and the second magnet,
wherein the yoke comprises a protrusion that overlaps the second magnet along the third direction.

5. The lens driver of claim 2, wherein
a thickness of the first magnet and a thickness of the second magnet are different from each other along the third direction.

6. The lens driver of claim 5, wherein
the thickness of the first magnet is larger than the thickness of the second magnet.

7. The lens driver of claim 6, further comprising a yoke that is disposed on rear surfaces of the first magnet and the second magnet,
wherein the yoke has a flat surface.

8. The lens driver of claim 6, wherein
the first magnet comprises a first portion facing the coil along the third direction and a second portion facing the sensing portion, and
a thickness of the second portion of the first magnet and a thickness of the second magnet are equal to each other.

9. A lens driver comprising:
a first coil and a second coil that are disposed on a substrate extending in a first direction and a second direction, and disposed apart from each other;
a sensing portion that overlaps an area between the first coil and the second coil in a plane formed by an intersection of the first direction and the second direction, along a third direction that is perpendicular to the first direction and the second direction;
a first magnet that overlaps the first coil along the third direction; and
a second magnet that overlaps the second coil along the third direction,
wherein the sensing portion does not overlap the first coil and the second coil along the third direction.

10. The lens driver of claim 9, wherein
the substrate includes a hole, and
the sensing portion is disposed inside the substrate.

11. The lens driver of claim 9, wherein
the sensing portion is disposed on a rear surface of the substrate.

12. The lens driver of claim 9, wherein
the sensing portion overlaps an end of the first magnet and an end of the second magnet along the third direction, and the sensing portion overlaps a portion between the first magnet and the second magnet along the third direction.

13. The lens driver of claim 12, wherein
the substrate includes a hole, and
the sensing portion is disposed to face the hole.

14. The lens driver of claim 9, wherein the sensing portion is disposed on a plane that faces the first magnet and the second magnet.

15. The lens driver of claim 14, wherein
the sensing portion overlaps a portion between the first magnet and the second magnet along the third direction.

16. A lens driver comprising:
a coil that is disposed in a substrate that extends in a first direction and a second direction;

a sensing portion that is disposed at an inner side of the coil to not overlap the coil along a third direction that is perpendicular to the first direction and the second direction;

a magnet that overlaps the coil; and a yoke that is disposed on a rear surface of the substrate, wherein the yoke includes a hole, and the sensing portion overlaps the hole along the third direction.

17. The lens driver of claim 16, further comprising a sub-yoke that is spaced apart from the coil and faces the magnet, wherein the substrate includes a trench, and the sub-yoke faces the trench of the substrate.

18. The lens driver of claim 16, further comprising a sub-yoke that is spaced apart from the coil, and faces a magnet, wherein the sub-yoke is embedded to the yoke.

19. A lens driver comprising:

a first coil and a second coil that are disposed in a substrate extending in a first direction and a second direction, and spaced apart from each other along the first direction;

a sensing portion disposed on a first side of the substrate and that overlaps an area between the first coil and the second coil along a third direction that is perpendicular to the first direction and the second direction;

a first magnet disposed on a second side of the substrate opposing the first side and that overlaps the first coil along the third direction; and a second magnet disposed on the second side of the substrate and that overlaps the second coil along the third direction, wherein the sensing portion does not overlap the first coil and the second coil along the third direction.

20. The lens driver of claim 19, wherein:

the sensing portion is disposed on a plane that faces the first magnet and the second magnet of the substrate.

* * * * *